United States Patent
Hong

(10) Patent No.: US 9,604,863 B2
(45) Date of Patent: Mar. 28, 2017

(54) PRESSURE CYCLING WASTEWATER TREATMENT APPARATUS

(71) Applicant: P. K. Andy Hong, Salt Lake City, UT (US)

(72) Inventor: P. K. Andy Hong, Salt Lake City, UT (US)

(\*) Notice: Subject to any disclaimer, the term of this patent is extended or adjusted under 35 U.S.C. 154(b) by 280 days.

(21) Appl. No.: 14/451,440

(22) Filed: Aug. 5, 2014

(65) Prior Publication Data

US 2016/0039691 A1     Feb. 11, 2016

Related U.S. Application Data

(60) Provisional application No. 61/862,244, filed on Aug. 5, 2013.

(51) Int. Cl.

| | | |
|---|---|---|
| *B01D 43/00* | (2006.01) | |
| *C02F 1/78* | (2006.01) | |
| *C02F 1/72* | (2006.01) | |
| C02F 101/32 | (2006.01) | |
| C02F 1/00 | (2006.01) | |
| C02F 1/74 | (2006.01) | |
| C02F 1/76 | (2006.01) | |

(Continued)

(52) U.S. Cl.
CPC ............ *C02F 1/78* (2013.01); *C02F 1/72* (2013.01); *C02F 1/001* (2013.01); *C02F 1/74* (2013.01); *C02F 1/76* (2013.01); *C02F 2101/20* (2013.01); *C02F 2101/32* (2013.01); *C02F 2101/36* (2013.01); *C02F 2101/363* (2013.01); *C02F 2101/366* (2013.01); *C02F 2301/066* (2013.01); *C02F 2303/04* (2013.01); *C02F 2305/023* (2013.01)

(58) Field of Classification Search
USPC .................................................. 210/808
See application file for complete search history.

(56) References Cited

U.S. PATENT DOCUMENTS

| | | |
|---|---|---|
| 2,606,150 A | 8/1952 | Thorp |
| 4,333,263 A | 6/1982 | Adey |

(Continued)

FOREIGN PATENT DOCUMENTS

| | | | |
|---|---|---|---|
| EP | 2322760 | 5/2011 | |
| JP | 2008023491 | \* 2/2008 | ............... C02F 1/72 |
| WO | WO 2007/120735 | 10/2007 | |

*Primary Examiner* — Nina Bhat
(74) *Attorney, Agent, or Firm* — Thorpe North & Western, LLP

(57) ABSTRACT

A pressure cycling wastewater treatment apparatus can include a confined chamber which encloses an interior volume. The confined chamber can have a wastewater inlet through which wastewater can flow into the confined chamber. In addition, an expansion fluid inlet can receive an expansion fluid into the confined chamber. A treated water outlet can allow treated water to flow out of the confined chamber. Within the interior volume of the confined chamber, a mechanical pressurizing element can be configured to move in a cyclical pattern. Motion of the mechanical pressurizing element can cyclically compress and decompress a mixture of wastewater and expansion fluid inside the confined chamber. The motion of the mechanical pressurizing element can be driven by a driving unit connected to the mechanical pressurizing element through a crankshaft.

20 Claims, 5 Drawing Sheets

(51) Int. Cl.
*C02F 101/20* (2006.01)
*C02F 101/36* (2006.01)

(56) References Cited

U.S. PATENT DOCUMENTS

| | | | |
|---|---|---|---|
| 4,610,793 A * | 9/1986 | Miller | E21B 36/00 |
| | | | 166/265 |
| 5,131,820 A | 7/1992 | Jensen | |
| 5,527,456 A | 6/1996 | Jensen | |
| 5,573,669 A | 11/1996 | Jensen | |
| 5,591,341 A | 1/1997 | Jensen | |
| 5,735,934 A | 4/1998 | Spears | |
| 5,985,147 A | 11/1999 | Jensen et al. | |
| 6,394,329 B1 | 5/2002 | Magee | |
| 6,726,885 B2 | 4/2004 | Borgstrom | |
| 6,780,331 B2 | 8/2004 | Galatro et al. | |
| 6,821,443 B2 | 11/2004 | Kim | |
| 6,835,560 B2 | 12/2004 | Greene | |
| 6,921,476 B2 | 7/2005 | Abe et al. | |
| 6,962,654 B2 | 11/2005 | Arnaud | |
| 6,991,735 B2 | 1/2006 | Martin | |
| 7,014,767 B2 | 3/2006 | Jensen | |
| 8,312,859 B2 * | 11/2012 | Rom | F01C 1/22 |
| | | | 123/213 |
| 2008/0078699 A1 * | 4/2008 | Carr | E21B 21/065 |
| | | | 209/233 |
| 2013/0228532 A1 * | 9/2013 | Carr | E21B 21/065 |
| | | | 210/780 |
| 2015/0048037 A1 * | 2/2015 | Frazier | B07B 1/28 |
| | | | 210/808 |
| 2016/0038858 A1 * | 2/2016 | Cady | E21B 21/066 |
| | | | 210/785 |

\* cited by examiner

PRESSURE CYCLING WASTEWATER TREATMENT APPARATUS

RELATED APPLICATION(S)

This application converts a previous provisional filing No. 61/862,244 dated Aug. 5, 2013 to this non-provisional filing (Filing receipt *OC000000063327333*; Confirmation No. 7402).

BACKGROUND

Population centers in the U.S. and around the world face increasing challenges to provide safe water supplies, and will increasingly demand new technologies for reclamation and reuse of wastewater. Wastewater treatment is also desirable in many industries to prevent pollution of rivers, lakes, and groundwater.

Accordingly, the treatment of contaminated water will continue to be an important issue as science and techniques addressing water quality issues advance. The availability of technically and economically effective technologies for water treatment and reclamation is desirable. The presence of new contaminants of concern such as those identified by EPA's CCL 2 and effective methods for their control, therefore, is an important issue.

Many processes are currently available for bioremediation which have benefits and drawbacks. One such natural process is when water flows over stationary algae or periphyton. Water remediation by regularly harvested periphyton has been shown to be 50 to 1000 times higher than constructed wetland systems per unit area. Accordingly, remediation can occur when water flows over man-made or artificial stationary algae taking up macro nutrients (carbon, nitrogen and phosphorus) and micro nutrients, while discharging oxygen as high as three times saturation. Further, this high oxygen and hydroxyl environment can reduce organic sediments by 0.25 meters per year. In extended time experiments, periphyton increases pH due to carbon uptake to as high as 11. Filtration can occur through adsorption, absorption, physical trapping, and other more complex mechanisms.

Further studies of periphyton filtration are disclosed in U.S. Pat. Nos. 4,333,263; 5,131,820; 5,527,456; 5,573,669; 5,591,341; 5,846,423; and 5,985,147. Periphyton filters (PF) have found use in a variety of applications, for example, as filters in aquaria, natural periphyton are used to remove nutrients and other contaminants from polluted waters. However, such natural processes require large areas and consume vast resources and are impractical for large scale operation.

Other wastewater treatment techniques known in the art include the treatment of wastewater with ozone (triatomic oxygen or $O_3$). Ozone is a naturally occurring gas created, for example, by corona discharge during lightning storms or by UV light from the sun. Ozone occurs in an upper atmospheric layer and is believed to be critical to temperature balance on Earth, while ozone in the lower atmosphere is commonly viewed as a pollutant. Ozone treatment is currently used for drinking and wastewater treatment as well as air filtration with doses taking into account health and safety factors. Examples of patents discussing the treatment of a sample with ozone include, among others, U.S. Pat. Nos. 7,014,767; 6,991,735; 6,394,329; 6,962,654; 6,921,476; 6,835,560; 6,780,331; and 6,726,885.

As well, it is known to use microbubbles to treat wastewater. Examples of the use of microbubbles to treat wastewater include generating microbubbles, coating them with a contaminant degenerative liquid, and passing the coated microbubbles through a wastewater stream. Other microbubble techniques include aeration of septic tanks by drawing atmospheric air into an expansion chamber and from there into agitated sludge to provide low pressure small microbubbles which have long residence times in the sludge material. Aeration devices which disperse microbubbles into a liquid and maintain transfer of gas to the liquid across a fiber membrane are also used where gas pressures are above the bubble point of the fiber membranes. A cloud of microbubbles is expelled into the liquid as it is forced to flow past the fibers. Although somewhat effective in decontamination, in large part due to increased contact surface areas, these approaches can be limited in their efficiencies, can require expensive equipment, and can be difficult to maintain.

Despite the above approaches and technologies, the need remains for methods and systems which can further increase treatment efficiencies and are safe, reliable and cost effective.

SUMMARY

A pressure cycling wastewater treatment apparatus can include a confined chamber which encloses an interior volume. The confined chamber can have a wastewater inlet through which wastewater can flow into the confined chamber. In addition, an expansion fluid inlet can receive an expansion fluid into the confined chamber. A treated water outlet can allow treated water to flow out of the confined chamber. Within the interior volume of the confined chamber, a mechanical pressurizing element can be configured to move in a cyclical pattern. Through motion of the mechanical pressurizing element, cyclical compression and decompression can be applied to a mixture of wastewater and expansion fluid inside the confined chamber. The motion of the mechanical pressurizing element can be driven by a driving unit connected to the mechanical pressurizing element through a crankshaft.

In some embodiments, the wastewater inlet and the expansion fluid inlet can be two separate inlets, and the wastewater and expansion fluid can mix inside the confined chamber subsequent to entering through the inlets. In other embodiments, the wastewater inlet and expansion fluid inlet can be a single inlet, and the wastewater and expansion fluid can be mixed outside the confined chamber, prior to being introduced through the inlet, or can be introduced sequentially through a common inlet. Further, the wastewater inlet and the treated water outlet can each include a valve, so that the inlet valve can be selectively opened to receive wastewater into the confined chamber, and the outlet valve can be selectively opened to release treated water from the confined chamber. A timing mechanism can be operatively connected to one or both of the valves so that the timing mechanism can cause one or both of the valves to open at a designated time. In some embodiments, for example, the timing mechanism can be configured to open the intake valve or the outlet valve after more than one compression and decompression cycle has occurred. In one embodiment the timing mechanism can be configured to open the outlet valves after 10 to 50 cycles.

The mechanical pressurizing element can be configured to provide a variety of pressures and compression ratios. In one embodiment, the compression ratio of the apparatus can be between about 5 and about 10, although up to 15 can also be suitable. Within compressed space of the cylinder, the gas volume to water volume ratio can be varied to achieve different compression pressures. In other embodiments, the mechanical pressurizing element can be configured to pressurize the wastewater and expansion fluid to between about 30 psi and about 300 psi. The mechanical pressurizing element can be any shape that allows cyclical compression and decompression of the wastewater and expansion fluid inside the confined chamber. For example, in some embodiments the mechanical pressurizing element can be a rotor or a piston similar to those used in rotary or piston-type internal combustion engines. The motion of the mechanical pressurizing element can be driven by a driving unit connected to the mechanical pressurizing element by a crankshaft. In some embodiments, the driving unit can be an electric motor, an internal combustion engine, a gas turbine, a steam turbine, or a wind turbine.

In some embodiments, the apparatus can include a stream of wastewater flowing into the confined chamber through the wastewater inlet. A filter can be operatively connected to the wastewater inlet and configured to filter the wastewater before it enters the wastewater inlet. Typically the filter can be a particulate filter which removes solids based on particle size such as by using a mesh, screen or other aperture barrier built of any materials including, but not limited to, metals, alloys, sand, minerals, organic or inorganic, natural or manmade. Other filters can include, but are not limited to, adsorption filters, and the like. In other embodiments, a filter can be operatively connected to the treated water outlet and configured to filter the treated water after it is released from the treated water outlet.

In some embodiments, the apparatus can include an expansion fluid within the confined chamber. The expansion fluid can be any fluid capable of creating microbubbles in the wastewater during the compression and decompression cycles. For example, in some embodiments, the expansion fluid can include ozone gas, chlorine gas, air, nitrogen, oxygen, carbon dioxide, argon, helium, water vapor, or combinations thereof.

A single pressure cycling wastewater treatment apparatus according to the present invention can be used to treat wastewater and produce treated water of a desired purity. Alternatively, multiple pressure cycling wastewater treatment apparatuses can be connected in series so that the treated water output from one apparatus is fed into the wastewater inlet of the subsequent apparatus. Thus the treated water can be made progressively cleaner through each apparatus. In this manner intermediate filtration and number of cycles can be used and adjusted based on clarity of inlet water to each staged apparatus.

Figure 1:
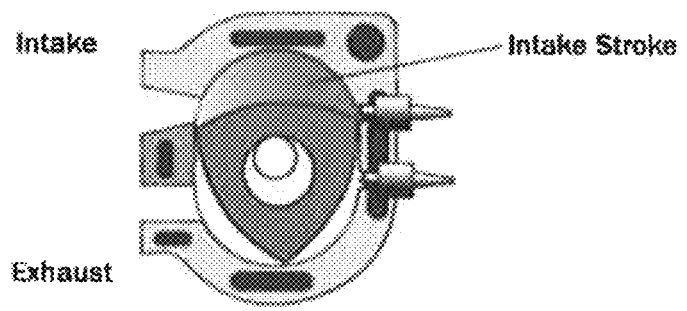
FIG. 1 is a cross sectional view of a rotary-type apparatus, showing the intake, compression, and exhaust strokes.
Figure 1:
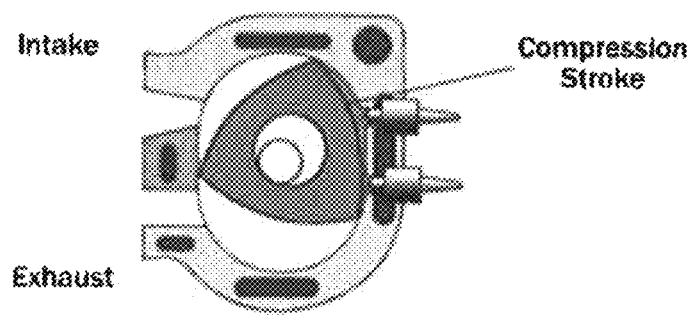
Figure 1:
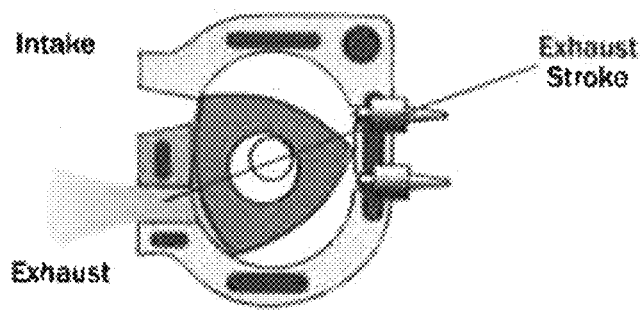

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used.

As used herein the term, "air" means and refers to a gaseous mixture that comprises at least about 20 mole percent $O_2$.

As used herein, the term "bacteria" means and refers to unicellular microorganisms as conventionally understood, although other microorganisms such as viruses, fungi, and other bioactive materials can be effectively treated with the present invention.

As used herein, the term "compression ratio" means and refers to the largest volume occupied by the wastewater and expansion fluid during decompression, divided by the smallest volume occupied by the wastewater and expansion fluid during compression. The change in volume is caused by the motion of the mechanical pressurizing element inside the confined chamber. A higher compression ratio indicates a greater difference between the compressed and uncompressed volumes, and therefore a greater difference in pressures. The compressed space can contain disparate volumes of expansion fluid and wastewater, resulting in varying pressures that are independent of compression ratio. Therefore, the wastewater and gas ratio can be independently varied based on materials used and treated.

As used herein, the term "confined chamber" means and refers to a vessel capable of enclosing and confining materials such as liquids and gases. It is to be understood in the context of the present invention that the confined chamber can have one or more openings, such as inlets and outlets. Further, the inlets and outlets can have valves that close to prevent the entrance or exit of fluids, thus confining them in the chamber. In other embodiments, the motion of the mechanical pressurizing unit within the confined chamber can force fluids into a portion or subvolume of the confined chamber, thus confining them in that subvolume. The inlets and outlets can remain open while the fluids are confined within a subvolume of the chamber.

As used herein, the term "contaminant" or "contaminants" means and refers to any agent that directly, or indirectly, has a detrimental effect on the environment or a living creature (e.g., human, animal, insect, plant), such as, but not limited to a chemical, biological, inorganic, or combinations of these contaminants. Contaminants can include, but are not limited to, volatile organic compounds, non-volatile organic compounds, polyaromatic hydrocarbons (PAHs) (e.g., anthracene, fluoranthene, phenanthrene, naphthalene); polychlorinated biphenyls (PCBs) (e.g., arochlor 1016); hydrocarbons (e.g., petroleum residues from oil and gas production, etc.), chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiarybutyl ether (MTBE); and BTEX (e.g., benzene, toluene, ethylbenzene, xylenes, and the like); explosive residues (e.g., nitrobenzenes, RDX, HMX, trinitrotoluene (TNT), nitroaromatics, etc.); chlorinated pesticides (e.g., chlordane, heptachlor, etc.); microorganisms such as *E-Coli*, Coliform, bacteria, virus, etc.; inorganic materials such as metals, nitrates, semi-metals, etc; and/or the like. The microbubbles, apparatuses, and methods herein are useful in remediating contaminants, including any one, or combinations of those delineated herein.

As used herein, the term "expansion fluid" refers to a continuous, amorphous fluid substance whose molecules move freely past one another and that has the tendency to assume the shape of its container, for example, a liquid or a gas or a mixture of both, and exhibits substantial volumetric changes with changes in pressure. The expansion fluid can include, or consist essentially of, active compounds such as oxidizing agents, extraction agents, and/or a reactive or nonreactive gas or gas mixture.

As used herein, the term "ozone" means and refers to a colorless gaseous substance ($O_3$) obtained (as by the passage of an electrical current in oxygen) as an allotropic form of oxygen, containing three atoms in the molecule. Ozone is about 1.5 times as dense as oxygen and 12.5 times more soluble in water and at high doses leaves substantially no residuals or byproducts except oxygen and a minimal amount of carbon dioxide, trace elements, and water. Ozone can be manufactured from dry air or from an oxygen containing gas by passing the gas through an electric field of high potential sufficient to generate a corona discharge between the electrodes. This corona discharge is just under the energy level of an automotive spark plug. Ultraviolet light and shorter-wavelength radiation also causes oxygen to undergo conversion to $O_3$, which may be used for industrial wastewater. Ozone is a more potent germicide than hypochlorous acid by factors of 10-100 fold and disinfects about 3125 times faster than chlorine. However, ozone is highly unstable and must typically be generated on site. The measure of an oxidizer and its ability to oxidize organic and inorganic material is its oxidation potential (measured in volts of electrical energy). The oxidation potential of 03 (−2.07 V) is greater than that of hypochlorous acid (−1.49 V) or chlorine (−1.36 V), the latter agents being widely used in water treatment. If used, ozone can typically comprise a very low concentration from about 0.1% to about 3% of the expansion fluid.

As used herein, "removing" refers to any treatment which results in the contaminant being rendered harmless or nonexistent. For example, removal can include actual separation or chemical reaction to form non-contaminant materials, e.g. via destruction of the contaminant by formation of fragments, or other products.

As used herein, the term "slurry" means and refers to a liquid containing a solids content which is more than incidental solids debris. Although the percent solids can vary considerably, a slurry sample can have from 2% to 95% by weight of solids. High solids (e.g. 20% to 70%) and low solids (e.g. 2% to 15%) slurries can be of particular interest in the present invention. Contaminated slurries can also include those substantially free of solids, e.g. non-slurry samples.

As used herein, the term "treated water" means and refers to water that has been subjected to at least one compression and decompression cycle in the pressure cycling wastewater treatment apparatus. Treated water does not necessarily meet any particular standard of purity. Subjecting the water to multiple compression and decompression cycles or running the water through multiple apparatuses in series can increase the purity of the water, or at least convert contaminants in the water to other forms that are less dangerous or easier to separate.

The singular forms "a," "an," and "the" include plural referents unless the context clearly dictates otherwise. Thus, for example, reference to "a particle" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Pressure Cycling Wastewater Treatment Apparatus

A Pressure cycling wastewater treatment apparatus can include a confined chamber which encloses an interior volume. The confined chamber can have a wastewater inlet through which wastewater can flow into the confined chamber. In addition, an expansion fluid inlet can receive an expansion fluid into the confined chamber. A treated water outlet can allow treated water to flow out of the confined chamber. Within the interior volume of the confined chamber, a mechanical pressurizing element can be configured to move in a cyclical pattern. Through the motion of the mechanical pressurizing element, it can cyclically compress and decompress a mixture of wastewater and expansion fluid inside the confined chamber. The motion of the mechanical pressurizing element can be driven by a driving unit connected to the mechanical pressurizing element through a crankshaft.

Generally, the compression and decompression cycles can cause formation of microbubbles in the wastewater, which enhances treatment of the wastewater. Microbubbles can provide abundant interfacial regions near the gas-liquid films, which provide favorable partitioning zones for extracting and concentrating into the films harmful chemical and biological agents. In one aspect of the present invention the nucleation and growth of microbubbles containing a disinfectant such as ozone can occur at the energetically favorable (non-wetting) surface of particulate matter or microorganisms, thereby accentuating the exposure of potential pathogens present in the sample to ozone.

The compression and decompression cycle can be repeated a number of times to provide enhanced water treatment. The repetition of these steps provides enhanced degradation of solid contaminant particles and enhanced decontamination efficiency due to the increased exposure of the contaminants. The elevated pressure caused by the compression enables the expansion fluid to effectively penetrate the pores of particulate matter that often shields harmful chemicals and microbes. When the expansion fluid includes an oxidizing agent or when the penetration of the expansion fluid occurs in the presence of an extraction agent or biocide, the liquid entering the pores carries such agents to the contaminants.

When the contaminant is a living cell, such as a bacterial cell, the use of an expansion fluid containing an oxidizing agent can allow for the infusion of the oxidizing agent into the cell where the oxidizing agent can disrupt cell function. Additionally, when the sample is depressurized the rapid expansion of the fluid can cause the cell to burst, providing disinfection.

The expansion fluid can dissolve or at least partially dissolve in the wastewater. This occurs especially during the compression part of the cycle, when higher pressure increases solubility of the expansion fluid and allows more expansion fluid to dissolve in the wastewater. As decompression occurs, the expansion fluid comes out of solution and forms microbubbles. The motion of the mechanical pressurizing element can provide significant agitation to the wastewater and expansion fluid mixture, which can increase both the dissolution of expansion fluid during compression and the formation of microbubbles during decompression. Thorough mixing of microbubbles within the wastewater also improves contact with contaminants and can further reduce contact times needed to obtain desired results.

In some embodiments, the wastewater inlet and the expansion fluid inlet can be two separate inlets, and the wastewater and expansion fluid can mix inside the confined chamber subsequent to entering through the inlets. In other embodiments, the wastewater inlet and expansion fluid inlet can be a single inlet, and the wastewater and expansion fluid can be mixed outside the confined chamber, prior to being introduced through the inlet. Further, the wastewater inlet and the treated water outlet can each include a valve, so that the inlet valve can be selectively opened to receive wastewater into the confined chamber, and the outlet valve can be selectively opened to release treated water from the confined chamber.

The expansion fluid inlet can also include a valve to control entry of expansion fluid into the confined chamber. The expansion fluid inlet valve and the wastewater inlet valve can be configured to admit wastewater and expansion fluid in any amounts. In some embodiments, the amounts of wastewater and expansion fluid admitted can be selected so that the volume ratio of admitted expansion fluid to admitted wastewater can be adjusted in light of the compression ratio to achieve pressure between 30 and 300 psi. The exact amounts of admitted gas and liquid volumes would depend on the cylinder size, compression ratio, and injected materials to achieve optimal pressure for treatment performance.

A timing mechanism can be operatively connected to one or more of the inlet and outlet valves so that the timing mechanism can cause one or more of the valves to open at a particular time. In some embodiments, for example, the timing mechanism can be configured to open the intake valves or the outlet valve after more than one compression and decompression cycle has occurred. In one embodiment the timing mechanism can be configured to open the inlet and outlet valves after 10 to 50 cycles. Wastewater can be treated to higher purity levels by subjecting the wastewater to more cycles before opening an outlet valve to release treated fluid. The timing mechanism and the valves can be used to increase the purity of the treated fluid by opening the inlet valve to allow wastewater to enter, then closing the valve while the wastewater undergoes a predetermined number of cycles, and then opening the outlet valve so that water flows out as treated water. It is also possible to increase the number of cycles by increasing the speed of the driving unit, thereby increasing the speed or frequency of the cycles. In this way, more cycles can be performed in the same amount of time. In one aspect, at least one intake and one exit will be provided for gas expansion fluid, and at least one intake and one exit will be provided for the wastewater. These at least two intakes and at least two exits (e.g. typically valves) can be individually controlled as to allow concurrent or sequenced intakes of gas and liquid, and to allow concurrent or sequenced ejection of gas and liquid. For example, 1 to 100 pressure cycles (piston strokes) can be applied before the gas is released or replaced by a fresh admission of gas or before release. A single charge or multiple charge of expansion fluid can be included during each set of pressure cycles. In other words, a control mechanism can control the independent admission and release of gas and liquid (timing and amounts), so that pressure, pressure cycles, expansion fluid dose, treatment rate can be tailored for different wastewaters as needed.

In some embodiments, the desired number of cycles can be determined ahead of time so that the timing mechanism can be configured for that number of cycles. In other embodiments, the timing mechanism can be connected to a processor and sensors configured to make real-time changes to the number of cycles. For example, contaminant sensors can be placed within the confined chamber to detect levels of contamination in the wastewater within the confined chamber. These sensors can include light sensors to measure clarity of the water or chemical sensors to measure concentrations of contaminants The sensors can be connected to a processor configured to signal the timing mechanism to open the outlet valve when the water reaches a predetermined level of purity. Alternatively, sensors can be placed upstream to detect the level of contamination of the wastewater stream before it enters the confined chamber, and the processor can predictively determine the correct number of cycles needed to treat the water.

The decompression portion of the cycle can result in any pressure reductions sufficient to create microbubbles. Typically, this can range from about 10 psi to about 1000 psi, although pressure drops outside this range can also be suitable. In one embodiment, the pressure reduction during decompression is from about 40 psi to about 200 psi. In one embodiment, the pressure reduction is from about 100 to about 500 psi. In another embodiment, the pressure reduction is at least 75 psi. In yet a further embodiment the wastewater and expansion fluid are at ambient pressure after the decompression occurs.

The mechanical pressurizing element can be configured to provide a variety of pressures and compression ratios. In one embodiment, the compression ratio of the apparatus can be between about 5 and about 10. In other embodiments, the mechanical pressurizing element can be configured to pressurize the wastewater and expansion fluid to between about 40 psi and about 200 psi.

The mechanical pressurizing element can be any shape that allows it to cyclically compress and decompress the wastewater and expansion fluid inside the confined chamber. For example, in some embodiments the mechanical pressurizing element can be a rotor or a piston similar to those used in rotary or piston-type internal combustion engines. Conventional rotary engines, also known as Wankel engines, use a rotor mounted inside an oval-shaped housing, as shown in FIG. 1. The rotor has a triangular shape with curved sides, with the center mounted on a crankshaft so that the rotor turns eccentrically around the crankshaft. The three points of the rotor are configured to be in constant contact with the walls of the housing, so that the sides of the rotor and the walls of the housing form confined subvolumes that change in size as the rotor rotates. As shown in FIG. 1, in a rotary apparatus, the intake stroke occurs when fluids enter the housing. At this point, the subvolume in which the fluids enter is at its largest volume. Then as the rotor turns, the volume decreases at which point the fluid mixture is at its highest compression. Subsequently, the subvolume again increases in volume until the treated fluids are exhausted. The shape of the housing and rotor can be varied to provide other compression ratios.

Figure 2:
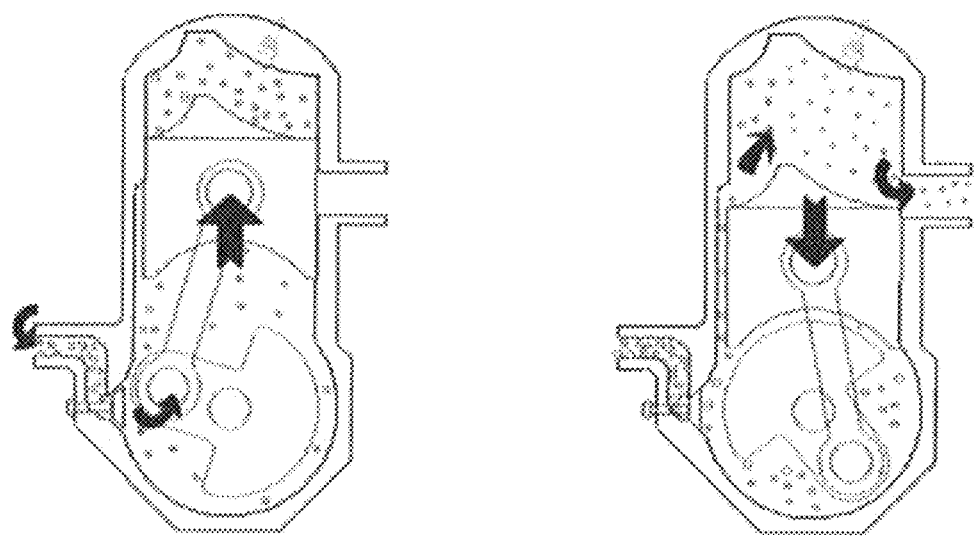
FIG. 2 is a cross sectional view of a piston-type apparatus, showing the compression and intake/exhaust strokes.

A two-stroke piston apparatus is shown in FIG. 2. A cylindrical piston is mounted so that the sides of the piston from a seal with the interior walls of the housing. The piston is connected to a crankshaft by a crankpin, so that the piston moves up and down as the crankshaft rotates. When the piston is at its lowest point, fluids (e.g. wastewater and expansion fluid) can enter into the space above the piston. As the piston rises, the volume of the space decreases, causing compression of the fluid mixture. When the piston is at its highest point, the fluid mixture is at maximum compression, at which point the piston moves back down allowing for decompression.

Figure 3:
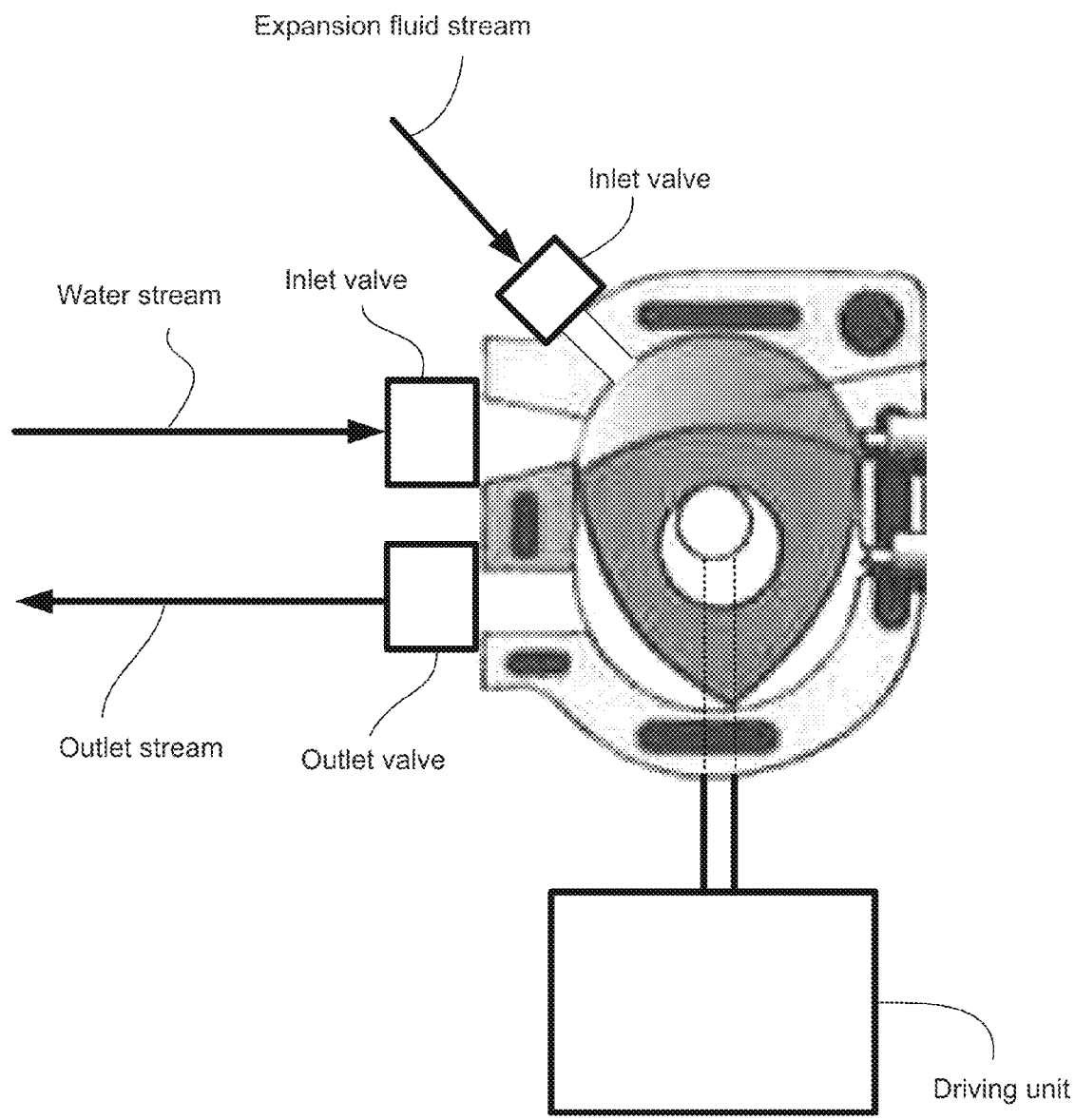
FIG. 3 is a cross sectional view of a pressure cycling wastewater treatment apparatus in accordance with an embodiment of the present invention.

FIG. 3 illustrates a rotary-type apparatus having an expansion fluid inlet valve and a wastewater stream inlet valve. A driving unit is also attached to the crankshaft which drives the rotary piston through the cycles discussed herein.

Figure 4:
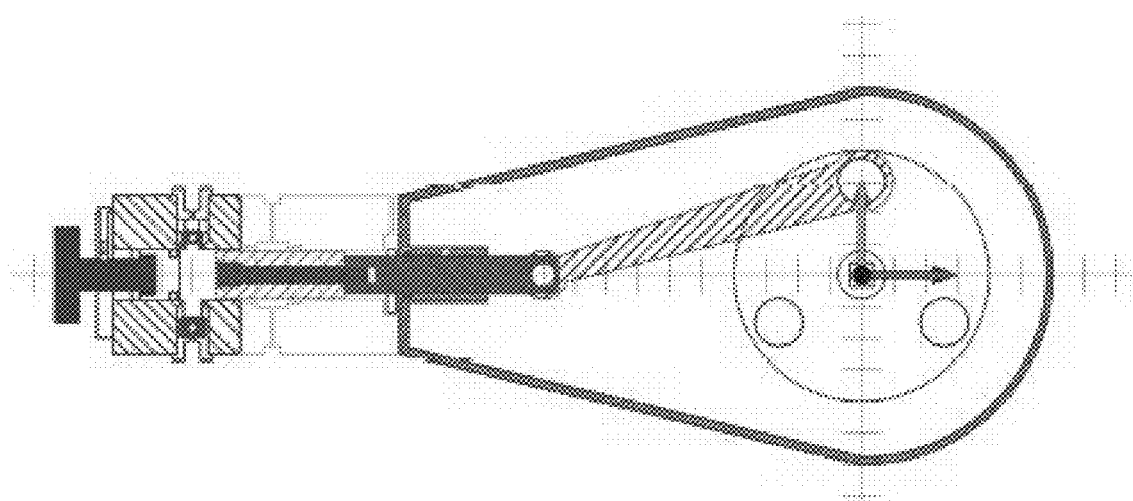
FIG. 4 is a cross sectional view of a triplex-type pressure cycling wastewater treatment apparatus in accordance with an embodiment of the present invention.
Figure 5:
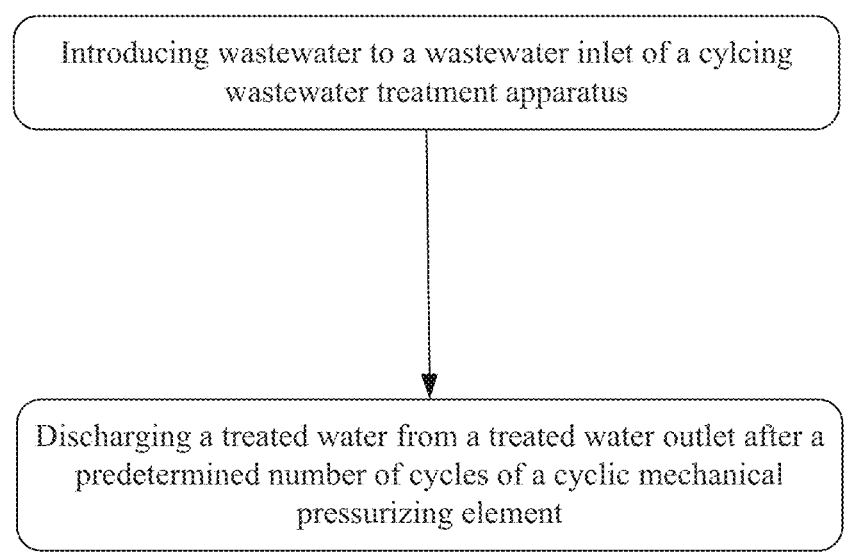
FIG. 5 is a flow chart of a method of treating wastewater using one embodiment of the present invention.

FIG. 4 shows another variation of the pressure cycling wastewater treatment apparatus which utilizes a configuration of a triplex pump. For example, the piston head can include an adjustable piston which allows for varying the compression ratio. The adjustable piston can be actuated by a servo motor, gas pressure adjustable piston, bladder type accumulator, or the like. Accordingly, soft solids (e.g. biomass such as activated 10 sludge, algae or the like) can be readily introduced without prior filtration. Resulting products can then optionally be used in renewable energy production (e.g. biogas, biodiesel and the like).

A pressure cycling wastewater treatment apparatus according to the present invention can include various configurations of rotors, pistons, housings, etc. However, the size and shape of the rotors, pistons, and housing can be modified to optimize wastewater treatment capabilities of the apparatus. For example, the shape of the rotors, pistons, and housing can be modified to change the compression ratio and the pressure difference in the compression and decompression cycles. For example, the cylinder length can be extended so as to decrease the compression ratio and to allow more space for wastewater treatment.

Unlike conventional internal combustion engines, which are designed to generate mechanical motion from combustion of fuel, a pressure cycling wastewater treatment apparatus does not independently generate mechanical motion. Instead, the motion of the mechanical pressurizing element can be driven by a driving unit. In some embodiments, the driving unit can be an electric motor, an internal combustion engine, a gas turbine, a steam turbine, or a wind turbine. Any method of supplying mechanical energy to move the mechanical pressurizing element can be suitable. For example, human power along with appropriate gear ratios to achieve desired compression ratios and cycling speeds can be used in areas where other sources of energy are scarce.

The driving unit can be connected to the mechanical pressurizing unit by a crankshaft. Depending on the form of the mechanical pressurizing unit, the crankshaft can include crankpins, i.e., for use with pistons, or eccentrics, i.e., for use with rotors. If multiple pressure cycling wastewater treatment apparatuses are used, each apparatus can have a dedicated driving unit or a single driving unit can power multiple apparatuses. For example, a single driving unit can be connected to a single crankshaft which drives multiple pistons or rotors.

The rotation of the crankshaft and associated motion of the mechanical pressurizing element can occur very rapidly and efficiently. Each rotation of the crankshaft can provide a complete compression and decompression cycle. In the case of a rotary apparatus, each time the rotor completes one rotation there are two complete compression and decompression cycles along each of the three sides of the rotor when the outlet valve remains closed, as wastewater and expansion fluid are confined in the spaces adjacent to each of the three sides of the rotor. This means that three fluid volumes pressure cycle twice during each complete revolution of the rotor.

The treatment of wastewater using the present invention can be continuous or nearly continuous. Wastewater flows into the wastewater inlet and then out of the treated water outlet as quickly as the mechanical pressurizing element can move or as quickly as the valves are configured to open. Even if the valves are configured not to open until multiple cycles have been performed, the cycles can be rapid enough that the flow of the water is substantially continuous. For example, the pressure cycling wastewater treatment apparatus can be operated at between 1,000 cycles per minute and 10,000 cycles per minute In one example, a 1-L engine cylinder with a compression ratio of 5, i.e., 200-ml space for wastewater and gas, can run at 1000 rpm. If half of this volume is wastewater, i.e. 100 mL and fill the rest with ozone gas (900 mL), and this charge of wastewater is treated with 5 pressure cycles with a single charge of the gas, then one can calculate: compression ratio=5, compression pressure=9 atm (or 130 psi when the piston is fully inserted), duration for 5 cycles=5 cycles/1000 cycles/min=0.005 min, equivalent to treating 100 mL/0.005 min=20 L/min for the 1-L cylinder engine (180 bbl/day). This calculation is based on a single charge of gas for a single charge of wastewater using 5 pressure cycles. Similar calculations can be made subject to changes in gas/water volume ratio, needed compression ratio, and rpm. The throughput of the apparatus can be adjusted by changing the speed at which the apparatus operates.

In some embodiments, the apparatus can include a stream of wastewater flowing into the confined chamber through the wastewater inlet. Using this apparatus can provide a very flexible method of treating small amounts of wastewater or very large amounts. For example, a small apparatus can treat 10 barrels of water per day, where a large apparatus could treat 50,000 barrels per day. In one alternative, an 8-cylinder engine apparatus running at 3000 rpm could treat 17,000 bbl/day. Larger capacities can be achieved by increasing the size of the apparatus, the speed at which pressure cycles are performed, or by using multiple apparatuses in series or in parallel. There is theoretically no upper or lower limit to the amount of wastewater than can be treated.

The wastewater stream can comprise water with substantially liquid contaminants, or the wastewater can comprise solid or particulate contaminants such as in a slurry. A slurry which can be treated with a pressure cycling wastewater treatment apparatus of the present invention can generally have a solids content of from 2% to 15% by weight. The slurry can be either natural or man-made and can have liquid components which include water, organic solvents, or mixtures thereof. The solid components of the slurry can be from any environmental source so long as the solid components can take the form of a slurry. In one embodiment, the slurry is a sediment slurry. Other examples of slurries can include widely varied amounts of solids present, but are not limited to contaminated drinking water, industrial wastewater, mine wastewater, sewage, surface water, groundwater, water containing petroleum chemicals produced during oil and gas production, other natural waters, mixtures of these slurries, and the like. Produced water has the problem of dispersed and dissolved oil. These oil contents can show up as volatile solids and dissolved solids. At low levels, hydrocarbon contamination causes oil sheen on water surfaces which is problematic for discharge to coastlines or use in many downstream applications.

The methods of the present invention can be used to remove a wide range of contaminants from a slurry. Non-limiting examples of such contaminants include persistent bioactive toxics (PBTs) such as polychlorinated biphenyls (PCBs), polyaromatic hydrocarbons (PAHs), and the like; viruses such as Echovirus, Hepatitis A and E, Rotavirus and Noroviruses (i.e., Norwalk-like viruses); enteric bacterial pathogens such as *Escherichia coli, Salmonella* species, *Shigella* species, *Vibrio cholerae*; and combinations thereof. Other examples of contaminants include but are not limited to acenaphthene, acenaphthylene, acrolein, acrylonitrile, aldrin, alpha-endosulfan, alpha-lindane, anthracene, antimony, aroclor 1016, aroclor 1221, aroclor 1232, aroclor 1242, aroclor 1248, aroclor 1254, aroclor 1260, arsenic, asbestos (friable), benz(a)anthracene, benzene, benzidine, benzo(a)pyrene, benzo(b)fluoranthene, benzo(ghi)perylene, benzo(k)fluoranthene, benzyl butyl phthalate, beryllium, beta-endosulfan, beta-lindane, bis(2-chloro-1-methylethyl) ether, bis(2-chloroethoxy)methane, bis(2-chloroethyl)ether, bis(2-chloroisopropyl)ether, bis(2-ethylhexyl)phthalate, bis (chloromethyl)ether, 4-bromophenyl phenyl ether, cadmium, camphechlor, carbon tetrachloride, 4-chlor-m-cresol, chlordane, chlorobenzene, chlorodibromomethane, chloroethane, 2-chloroethyl vinyl ether, chloroform, chloromethane, 2-chloronaphthalene, 2-chlorophenol, 4-chlorophenyl phenyl ether, chromium, chrysene, copper, cyanide, DDD, DDE, DDT, delta-lindane, di-n-octyl phthalate, di-n-propylnitrosamine, dibenz(a,h)anthracene, 1,2-dibromoethane, dibutyl phthalate, 1,4-dichlorobenzene, 1,2-dichlorobenzene, 1,3-dichlorobenzene, 3,3'-dichlorobenzidine, dichlorobromomethane, 1,2-dichloroethane, 1,1-dichloroethane, 1,1-dichloroethylene, dichloromethane, 2,4-dichlorophenol, 1,2-dichloropropane, 1,3-dichloropropene (mixed isomers), dieldrin, diethyl phthalate, dimethyl phthalate, 2,4-dimethylphenol, 4,6-dinitro-o-cresol, 2,4-dinitrophenol, 2,4-dinitrotoluene, 2,6-dinitrotoluene, 1,2-diphenylhydrazine, endosulfan sulfate, endrin, endrin aldehyde, ethylbenzene, fluoranthene, fluorine, gamma-lindane, heptachlor, heptachlor epoxide, hexachloro-1,3-butadiene, hexachlorobenzene, hexachlorocyclopentadiene, hexachloroethane, indeno (1,2,3-cd)pyrene, isophorone, lead, mercury, methanamine, n-methyl-n-nitroso, methyl bromide, n-nitrosodiphenylamine, naphthalene, nickel, nitrobenzene, 4-nitrophenol, 2-nitrophenol, pentachlorophenol, phenanthrene, phenol, pyrene, selenium, silver, 2,3,7,8-tetrachlorodibenzo-p-dioxin, 1,1,2,2-tetrachloroethane, tetrachloroethylene, 2,3,4,6-tetrachlorophenol, thallium, toluene, 1,2-trans-dichloroethylene, tribromomethane, 1,2,4-trichlorobenzene, 1,1,2-trichloroethane, 1,1,1-trichloroethane, trichloroethylene, 2,4,6-trichlorophenol, vinyl chloride, zinc, and combinations thereof. In one embodiment, the slurry can contain at least one contaminant selected from PAHs, MTBE, heavy metals, hydrocarbons, and combinations thereof.

In one specific embodiment of the present invention, the wastewater can be substantially free of solids such as water contaminated with soluble contaminants. Such soluble contaminants can include MTBE or any of the previously listed contaminants which are soluble in water. In a specific embodiment, the wastewater can include hydrocarbon contaminated water such as from gas or oil production. Most gas and oil production methods result in production of substantial amounts of water having hydrocarbons mixed therein. Ozone can be readily used to reduce, oxidize or convert hydrocarbon components into less harmful compounds (e.g. hydrogen gas, methane, etc.) or compounds which can be easily filtered. For example, ozonation in accordance with the present invention can result in formation of organic acids which agglomerate and can be easily filtered from the water. Such treatment can be performed sufficient to substantially eliminate oil sheen and/or dispersed oil so as to allow the water to be used for irrigation, discharge, or other purposes.

A filter can be operatively connected to the wastewater inlet and configured to filter the wastewater before it enters the wastewater inlet. This would allow for removal of solids before the wastewater enters the confined chamber. Such an embodiment can be useful for treating wastewater with a large amount of solids that could interfere with the mechanical parts of the apparatus. In other embodiments, a filter can be operatively connected to the treated water outlet and configured to filter the treated water after it is released from the treated water outlet. This can be useful in embodiments where the treated water is expected to contain filterable solids, such as ozonation of hydrocarbons as described above, which produces organic acids that can be filtered from the water after treatment. In a specific embodiment, a sand filter can be operatively connected to the treated water outlet. The sand filter can filter out ozonation products of hydrocarbons from the treated water stream. Filtration velocity is an important factor in sand filter effectiveness. Rapid sand filtration typically uses 5-10 cm/min filtration velocity, although other rates can be suitable.

In some embodiments, the apparatus can include an expansion fluid within the confined chamber. The expansion fluid can be any fluid capable of creating microbubbles in the wastewater during the compression and decompression cycles. For example, in some embodiments, the expansion fluid can include ozone gas, chlorine gas, air, nitrogen, argon, helium, water vapor, or combinations thereof. In one specific example, the expansion fluid can be ozone gas.

A single pressure cycling wastewater treatment apparatus according to the present invention can be used to treat wastewater and produce treated water of a desired purity. Alternatively, multiple pressure cycling wastewater treatment apparatuses can be connected in series so that the treated water output from one apparatus is fed into the wastewater inlet of the subsequent apparatus. Thus the treated water can be made progressively cleaner through each apparatus.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of treating wastewater, comprising:
   a) introducing a wastewater through a wastewater inlet of a wastewater treatment apparatus;
   b) compressing and decompressing the wastewater; and
   c) discharging treated water from a treated water outlet following a predetermined number of cycles of a mechanical pressurizing element;
   wherein the wastewater treatment apparatus comprises;
      a confined chamber enclosing an interior volume;
      the wastewater inlet in fluid communication with the confined chamber and operable to receive wastewater;
      the treated water outlet operably connected to the confined chamber and operable to release treated water; and
      the mechanical pressurizing element within the interior volume operable to cyclically compress and decompress the wastewater.

2. The method of claim 1, wherein the wastewater treatment apparatus further comprises a crank shaft operably connected to the mechanical pressurizing element.

3. The method of claim 2, wherein the wastewater treatment apparatus further comprises a driving unit connected to the crank shaft.

4. The method of claim 3, wherein the driving unit comprises a member selected from the group consisting of an electric motor, an internal combustion engine, a gas turbine, a steam turbine, and a wind turbine.

5. The method of claim 1, wherein the wastewater treatment apparatus further comprises an expansion fluid inlet in fluid communication with the confined chamber and operable to receive an expansion fluid.

6. The method of claim 1, wherein the wastewater inlet is further operable to receive an expansion fluid.

7. The method of claim 1, wherein the wastewater treatment apparatus further comprises an expansion fluid within the confined chamber, wherein the expansion fluid comprises a member selected from the group consisting of ozone gas, chlorine gas, air, nitrogen, argon, helium, water vapor, and combinations thereof.

8. The method of claim 1, wherein the introducing of the wastewater, further comprises flowing a wastewater stream through the wastewater inlet.

9. The method of claim 1, wherein the wastewater inlet further comprises an intake valve and the treated water outlet further comprises an outlet valve.

10. The method of claim 1, wherein the wastewater treatment apparatus further comprises a filter operatively connected to the wastewater inlet.

11. The method of claim 1, wherein the wastewater treatment apparatus further comprises a filter operatively connected to the treated water outlet.

12. The method of claim 11, wherein the wastewater treatment apparatus further comprises a timing mechanism operatively connected to at least one of the intake valve and the outlet valve, wherein the tinning mechanism is configured to open at least one of the intake valve and outlet valve.

13. The method of claim 12, wherein the timing mechanism is configured to open at least one of the intake valve and outlet valve after more than one compression and decompression cycle.

14. The method of claim 12, wherein the timing mechanism is configured to open at least one of the intake valve and outlet valve after from about 10 to about 50 compression and decompression cycles.

15. The method of claim 1, wherein the mechanical pressurizing element further comprises an adjustable cylinder configured to vary a compression ratio of the confined chamber.

16. The method of claim 1, wherein the mechanical pressuring element provides a compression ratio ranging from about 5 to about 10.

17. The method of claim 1, wherein the mechanical pressurizing element is configured to pressurize the wastewater from about 40 psi and about 200 psi.

18. The method of claim 1, wherein the mechanical pressurizing element comprises a member selected from the group consisting of a rotor, a piston, or a combination thereof.

19. The method of claim 1, wherein the mechanical pressurizing element is a triplex-type pump or a plunger pump.

20. The method of claim 1, further comprising a second wastewater treatment apparatus, wherein the treated water outlet of the wastewater treatment apparatus is operatively connected to a wastewater inlet of the second wastewater treatment apparatus.

* * * * *